United States Patent [19]

Garland et al.

[11] 4,430,368
[45] Feb. 7, 1984

[54] WATER REDUCIBLE MODIFIED POLYESTER RESIN

[75] Inventors: Barbara R. Garland, Elizabeth Township, Allegheny County; Mark D. Troutman, Greensburg, both of Pa.

[73] Assignee: Westinghouse Electric Corp., Pittsburgh, Pa.

[21] Appl. No.: 415,097

[22] Filed: Sep. 7, 1982

[51] Int. Cl.³ ............................................. B05D 3/02
[52] U.S. Cl. ............................. 427/385.5; 427/294; 427/295; 427/296; 427/388.3; 427/393.6; 427/389.8; 524/539; 525/443
[58] Field of Search ................ 524/539; 525/443; 427/295, 296, 388.3, 294, 385.5

[56] References Cited

U.S. PATENT DOCUMENTS 3,576,775  4/1971  Jaegersberg ........................ 525/443
3,907,736  9/1975  Barton et al. ...................... 525/443
4,088,619  5/1978  Holzrichter ....................... 524/539
4,101,496  7/1978  Dörffel et al. .................... 524/539
4,204,014  5/1980  Dörffel et al. .................... 525/443

*Primary Examiner*—Theodore E. Pertilla
*Attorney, Agent, or Firm*—R. D. Fuerle

[57] ABSTRACT

Disclosed is an improved water reducible modified polyester resin. The improvement is including in the resin about 20 to about 50% by weight, based on total solids weight, of a mixture of hexamethoxymethyl melamine and methylated melamine formaldehyde in a weight ratio of about 2 to 1 to about 1 to 2. The mixture is preferably about 25 to about 35% of the resin based on total solids weight and the weight ratio of hexamethoxymethyl melamine to methylated melamine formaldelhyde is preferably about 1 to 1. The mixture should be at least about 75% by weight of any melamine resin present.

6 Claims, No Drawings

WATER REDUCIBLE MODIFIED POLYESTER RESIN

BACKGROUND OF THE INVENTION

Water reducible polyester resins have been used commercially for some time to form protective coatings on electrical equipment such as motors and transformers. These resins are important because they meet the new Environmental Protection Agency regulations for low solvent-containing coatings or water-soluble coatings. While these resins have excellent electrical and physical properties, as an insulating varnish their usefulness would be extended and their importance increased if these properties could be improved upon.

SUMMARY OF THE INVENTION

We have discovered that when a mixture of hexamethoxymethyl melamine (HMMM) and methylated melamine formaldehyde (MMF) in a narrowly defined ratio is used as the melamine component of a water reducible modified polyester resin, synergistic improvements are observed in certain electrical and physical properties. Specifically, the bond strength, the chemical resistance to moisture and salt, the wet and dry dielectric strength, and the cure time are all superior in a resin containing the mixture of HMMM and MMF over an identical resin containing either HMMM or MMF alone at the same concentration. This is a highly unexpected and unusual result because this synergism was observed for only these two compounds (HMMM and MMF) and only in a narrow range of concentrations.

RELEVANT ART

U.S. Pat. No. 3,907,736 discloses an aqueous blend of a linear polyester and one or more aminoplast resins such as wholly or partially methylated melamine-formaldehyde condensates (lines 18-22 of column 5 and lines 25-30 of column 2).

U.S. Pat. No. 3,576,775 discloses a low temperature curing composition of an alkyd resin, a $C_1$ to $C_5$ hexamethoxymethyl melamine resin, and a urea-aldehyde resin.

U.S. Pat. No. 4,204,014 discloses a liquid coating composition of one or more aminoplast resins and one or more polyesters (see lines 35-50 of column 5).

DESCRIPTION OF THE INVENTION

The water reducible modified polyester resins which this invention improves upon are well known in the art. Generally these resins contain a saturated polyester, water, and various co-solvents such as the "CELLOSOLVES" (mono- and dialkyl ethers of ethylene glycol and their derivatives). These resins generally have high acid values and are usually solubilized by various amines. They can be (but are not necessarily) modified with water soluble phenolic resins. These resins are known as "water reducible" resins because, although they are clear, it is not yet certain whether they are actually emulsions or solutions. Since these resins all contain a melamine resin, the mixture of melamine resins according to this invention replaces some or all of the melamines present in these resins. Descriptions of such water reducible modified polyester resins can be found in U.S. Pat. Nos. 3,907,736; 3,576,775; and 4,204,014, herein incorporated by reference. An especially preferred example of such a resin is sold by Westinghouse Electric Corporation under the trade designation "B-535," which is a water reducible polyester resin containing 25% by weight based on total solids weight of HMMM.

According to the improvement of this invention, about 20 to about 50% by weight based on total solids weight of the water reducible modified polyester resin is a mixture of water soluble HMMM and water soluble MMF. While other melamines besides HMMM and MMF may be present if desired, the mixture of HMMM and MMF is preferably at least about 75% by weight of any melamine resin which is present.

It has been found that it is critical to use the particular two melamines HMMM and MMF as other melamines which were tested did not exhibit any synergistic improvement in properties.

MMF is prepared by first reacting melamine with formaldehyde according to the equation

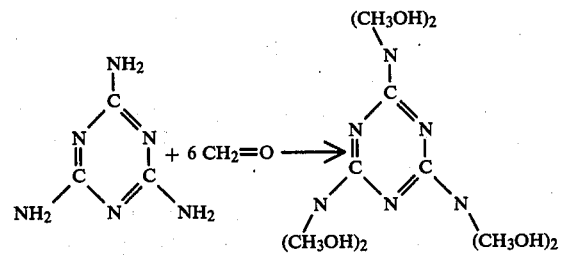

The melamine may be partially or completely reacted with the formaldehyde, depending on how many of the amino hydrogens are replaced by formaldehyde groups. The melamine formaldehyde is then methylated by reaction with methanol.

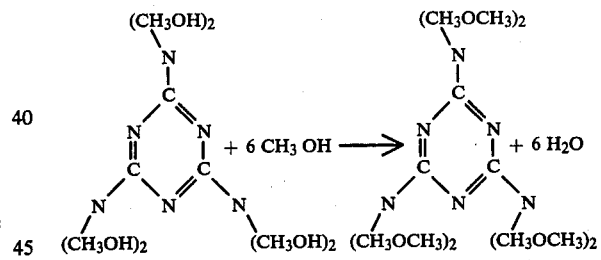

Of the six hydroxyls on a completely reacted melamine, formaldehyde which are available for methylation at least one must be methylated, and it is preferable to methylate at least half or these hydroxyls in order to increase the solubility of the compound.

The concentration of the mixture of HMMM and MMF in the water reducible resin, and the ratio of HMMM to MMF are critical to obtaining the synergistic properties of the resin. The mixture of HMMM and MMF must constitute about 20% to 50% by weight of the total solids of the water reducible resin because if less than 20% or more than 50% is used, the synergistic effects begin to disappear. It is preferable that the mixture constitutes about 25% to about 35% by weight of the total solids of the water reducible resin as the synergistic effects are at a maximum within that range. The weight ratio of HMMM to MMF must be between about 2 to 1 and about 1 to 2 because outside this ratio the synergistic effects also begin to disappear. The maximum synergistic effects observed at a weight ratio of HMMM to MMF of about 1:1.

The water reducible modified polyester resin can be prepared by adding its components in any order. It is preferable not to heat during blending. The water reducible resin can then be applied to a substrate by any suitable technique such as dipping, spraying, vacuum pressure impregnation, painting, or flow-coating. The substrate may be any substance which can withstand the cure temperature such as plastics, metals such as electrical grade steel, mica, and fiberglass. Once the resin has been applied to the substrate it is cured at a temperature which depends upon the particular resin used. Generally, the cure temperature will be between about 100° to about 200° C. for about 1 to about 3 hours.

The following examples show the criticality of the mixture of melamines of this invention and their concentration limits, and demonstrate that synergism was observed for the properties of bond strength, resistance to moisture and salt, wet and dry dielectric strength, and cure time.

EXAMPLE 1

Compositions were prepared from a solvent solution of a polyester resin containing a saturated or unsaturated fatty acid component. Based on the weight solids of this resin, various amounts of hexamethoxymethyl melamine (HMMM) and partially methylated melamine formaldehyde (MMF) were added. To this mixture, about 7% dimethylethanolamine was added to make the solution water soluble. Sufficient water was added to reduce the solution to a desired weight solids of 60%. The following table gives the percentages of HMMM and MMF in the compositions.

| COMPOSITION | HMMM | MMF |
|---|---|---|
| A | 50% | 0 |
| B | 12% | 13% |
| C | 15% | 35% |
| D | 35% | 15% |
| E | 0 | 50% |
| F | 25% | 25% |
| G | 25% | 0 |

The compositions were tested for bond strength according to ASTM D-2519-75. The folowing table gives the bond strength of the compositions at room temperature, at 100° C., and at 150° C. after two or four hours at 150° C.

| | BOND STRENGTH | | | | | |
|---|---|---|---|---|---|---|
| | 2 HRS. @ 150° C. REVERSE DIPPED | | | 4 HRS. @ 150° C. REVERSE DIPPED | | |
| | Room Temp. | 100° C. | 150° C. | Room Temp. | 100° C. | 150° C. |
| A | 38 Lbs. | 13 Lbs. | 7 Lbs. | 45 Lbs. | 20 Lbs. | 13 Lbs. |
| B | 33 Lbs. | 8 Lbs. | 3 Lbs. | 28 Lbs. | 9 Lbs. | 4 Lbs. |
| C | 30 Lbs. | 15 Lbs. | 7 Lbs. | 32.5 Lbs. | 17 Lbs. | 12 Lbs. |
| D | 28 Lbs. | 12 Lbs. | 5 Lbs. | 32 Lbs. | 13 Lbs. | 8 Lbs. |
| E | 10 Lbs. | — | 6 Lbs. | — | — | — |
| F | 32 Lbs. | 18 Lbs. | 10 Lbs. | 42 Lbs. | 23 Lbs. | 15 Lbs. |
| G | 20 Lbs. | 8 Lbs. | 3 Lbs. | 29.5 Lbs. | 11 Lbs. | 5 Lbs. |

The following results were concluded from the above table. In composition A, the bond strength at room temperature was very good but the resin lost bond strength at a higher rate as temperatures were increased. In composition B, it was thought that the addition of MMF to composition A would improve the overall bond strength but the product did not even match up on bond strength with composition A. In composition C, the bond strength at room temperature initially dropped again, but the bond strengths at 100° and 150° both increased to figures above what had been observed in compositions A and B. Composition E proved to be entirely too brittle but composition F was found to be the optimum.

EXAMPLE 2

The optimum composition from example 1 (composition F) was compared with other low solvent containing coatings or water soluble coatings used in the industry. The following table gives a description of the compositions compared in this example.

| COMPOSITION NUMBER | DESCRIPTION |
|---|---|
| 1 | A water dispersable polyester resin containing HMMM having a 50% on resin solids basis and a phenolic resin added at 28% on resin solids basis. |
| 2 | Water dispersable polyester resin containing HMMM at a 25% on resin solids basis. |
| 3 | Composition F from Example 1. |
| 4 | Water dispersable polyester resin containing HMMM at a 50% on resin solids basis. |

Bond strength tests were performed on these compositions as described in Example 1. The following table gives the results:

| | BOND STRENGTH | | | | | |
|---|---|---|---|---|---|---|
| | 2 HRS. @ 150° C. REVERSE DIPPED | | | 4 HRS. @ 150° C. REVERSE DIPPED | | |
| COM- POSI- tion | Room Temp. | 100° C. | 150° C. | Room Temp. | 100° C. | 150° C. |
| 1 | 37 Lbs. | 19 Lbs. | 13 Lbs. | 38 Lbs. | 27.5 Lbs. | 16 Lbs. |
| 2 | 20 Lbs. | 8 Lbs. | 3 Lbs. | 29.5 Lbs. | 11 Lbs. | 5 Lbs. |
| 3 | 32 Lbs. | 18 Lbs. | 10 Lbs. | 42 Lbs. | 23 Lbs. | 15 Lbs. |

The above table shows that Composition 3 had a bond strengths comparable to Composition 1. Composition 3 had stability and water solubility properties comparable to Composition 2.

The Compositions were tested for electrical strength according to ASTM D115, paragraphs 31 to 37.

The following table gives the results of these tests.

| | DIELECTRICS | |
|---|---|---|
| | WET | DRY |
| 1 | 3500 Volts/Mil | 4000 Volts/Mil |
| 2 | 3300 Volts/Mil | 3700 Volts/Mil |
| 3 | 3521 Volts/Mil | 4400 Volts/Mil |
| 4 | 3200 Volts/Mil | 3200 Volts/Mil |

The above table shows that Composition 3 had electrical properties which were superior to Compositions 2 and 4 and comparable with Composition 1.

We claim:

1. In a water reducible modified polyester resin which contains a melamine resin, the improvement which comprises including in said resin about 20 to about 50% by weight, based on total solids weight of said water reducible resin, of a mixture of water soluble hexamethoxymethyl melamine and water soluble methylated melamine formaldehyde in a weight ratio of about 1 to 1.

2. A resin according to claim 1 wherein said mixture is about 25 to about 35% by weight based on total solids weight.

3. A resin according to claim 1 wherein said mixture is at least about 75% by weight of any melamine resin present.

4. A resin according to claim 1 wherein said methylated melamine formaldehyde is at least 50% methylated.

5. A method of forming a coating on a substrate comprising applying a composition according to claim 1 to said substrate and curing said composition.

6. A coated substrate prepared according to the method of claim 5.

* * * * *